(12) United States Patent
Ryu et al.

(10) Patent No.: US 7,560,191 B2
(45) Date of Patent: Jul. 14, 2009

(54) SECONDARY BATTERY OF IMPROVED LIFE CHARACTERISTICS BY ELIMINATION OF METAL IONS

(75) Inventors: Ji Heon Ryu, Seoul (KR); Eun Ju Lee, Daejeon (KR); Jung Eun Hyun, Seoul (KR); Jaepil Lee, Daejeon (KR); Jeong Hee Choi, Busan (KR); Min Su Kim, Daejeon (KR); Youngjoon Shin, Daejeon (KR)

(73) Assignee: LG Chem, Ltd. (KR)

( * ) Notice: Subject to any disclaimer, the term of this patent is extended or adjusted under 35 U.S.C. 154(b) by 345 days.

(21) Appl. No.: 11/534,088

(22) Filed: Sep. 21, 2006

(65) Prior Publication Data

US 2007/0218354 A1    Sep. 20, 2007

(30) Foreign Application Priority Data

Oct. 26, 2005    (KR) .................... 10-2005-0101012

(51) Int. Cl.
    *H01M 4/58*    (2006.01)
(52) U.S. Cl. .............................. 429/231.95; 429/218.1; 429/248; 429/209; 429/252; 429/247
(58) Field of Classification Search .............. 429/218.1, 429/248, 231.95, 209, 252, 247
    See application file for complete search history.

(56) References Cited

U.S. PATENT DOCUMENTS

| 4,085,241 | A | * | 4/1978 | Sheibley ..................... 429/254 |
| 6,632,565 | B2 | * | 10/2003 | Nemoto ..................... 429/248 |
| 7,195,843 | B2 | * | 3/2007 | Alday Lesaga et al. ..... 429/232 |
| 2007/0166620 | A1 | * | 7/2007 | Issaev et al. ................ 429/206 |

FOREIGN PATENT DOCUMENTS

| JP | 61-264682 | * 11/1986 |
| JP | 2003323916 | 11/2003 |
| KR | 1020030013851 | 2/2003 |

* cited by examiner

*Primary Examiner*—Laura S Weiner
(74) *Attorney, Agent, or Firm*—Cantor Colburn LLP

(57) ABSTRACT

Disclosed herein is a lithium secondary battery having improved life characteristics by removal of metal ion impurities incorporated during an assembly process of the battery via a cation exchange process, thereby preventing electrodeposition of the metal ions on an anode, through the addition of a cation exchange material, containing cations selected from the group consisting of lithium, sodium, ammonium and any combination thereof, to an electrode and/or a surface of a separator.

8 Claims, No Drawings

SECONDARY BATTERY OF IMPROVED LIFE CHARACTERISTICS BY ELIMINATION OF METAL IONS

FIELD OF THE INVENTION

The present invention relates to a lithium secondary battery having improved life characteristics by elimination of metal ions. More specifically, the present invention relates to a lithium secondary battery having improved life characteristics, wherein metal ion impurities incorporated during an assembly process of the battery are removed via a cation exchange process to prevent electrodeposition of the metal ions on an anode, thus improving life characteristics, by the addition of a cation exchange material, containing cations selected from the group consisting of lithium, sodium, ammonium and any combination thereof, to an electrode and/or a surface of a separator.

BACKGROUND OF THE INVENTION

Rapid expansion in use of portable electronic equipment such as mobile phones, notebook computers, camcorders, digital cameras and the like has led to increased demands for secondary batteries having a high-energy density as a power source for such equipment. In recent years, applicability of secondary batteries has been realized as power sources for electric vehicles (EVs) and hybrid electric vehicles (HEVs).

As examples of such secondary batteries, lithium secondary batteries comprising an anode of a carbonaceous material, a cathode of a lithium metal oxide, a separator of a polyolefin material and a non-aqueous lithium salt electrolyte are widely used. For optimal use in the electronic equipment of interest or vehicles, the lithium secondary batteries require excellent life characteristics. As such, efforts and attempts to improve a battery life are continuously undertaken, because the battery must undergo little decrease of the capacity even after repeated charge/discharge cycles.

Batteries undergo deterioration of life characteristics due to degradation of individual components caused by various factors. One of the main causes for the deterioration of the battery life characteristics is incorporation of impurities into the battery. For example, as the incorporation of water into the battery accelerates the degradation of the battery performance, Korean Patent Registration No. 414588 discloses a technique of inhibiting adverse side reactions and gas evolution by adsorption of water and water-borne by-products via the addition of zeolite to an electrolyte. In addition, Japanese Patent Application No. 2003-323916 A1 discloses a technique of suppressing battery degradation by adsorption and removal of hydrofluoric acid produced from the reaction between water and lithium salts, via the addition of zeolite to an electrode active material or the like.

However, according to the experiments conducted by the inventors of the present invention, it was confirmed that internal short-circuiting occurs to thereby sharply decrease the battery capacitance when metal impurities are incorporated into the battery, even after complete removal of water inside the battery or the by-products produced from the reaction of water with the lithium salts. Further, incorporation of large quantities of the metal impurities results in a failure to sufficiently fulfill functions of the battery. Therefore, maximum care should be taken to ensure that incorporation of the impurities does not occur upon fabrication of the lithium secondary battery.

However, since it is in fact impossible to completely block the incorporation of the metal impurities which may occur during fabrication processes of the electrode active materials, conductive materials and the like, there is a need for the development of a technique to ensure that the internal short-circuiting of the battery does not take place even upon incorporation of the impurities.

SUMMARY OF THE INVENTION

Therefore, the present invention has been made to solve the above problems and other technical problems that have yet to be resolved.

As a result of a variety of extensive and intensive studies and experiments to solve the problems as described above, the inventors of the present invention have discovered that, upon the fabrication of a lithium secondary battery by inclusion of a certain material having a cation exchange capability in a specific part of the battery, it is possible to easily remove metal impurities seriously harmful to the life characteristics of the battery by an exchange of metal cations with the cations contained in the added material. The present invention has been completed based on these findings.

DETAILED DESCRIPTION OF PREFERRED EMBODIMENTS

Therefore, a lithium secondary battery according to the present invention is characterized in that metal ion impurities incorporated during an assembly process of the battery are effectively removed via a cation exchange process, through the addition of a cation exchange material, containing cations selected from the group consisting of lithium, sodium, ammonium and any combination thereof, to an electrode and/or a surface of a separator.

That is, the secondary battery according to the present invention improves life characteristics of the battery by replacing metal ions of metal impurities with lithium ions, sodium ions and/or ammonium ions which are not detrimental to the operation of the battery, thereby removing the impurities from the inside of the battery, through the incorporation of the above-mentioned cation exchange material into the battery.

For example, where the metal impurities such as iron (Fe), copper (Cu), nickel (Ni) and cobalt (Co) are incorporated into a cathode, the impurities are eluted toward an electrolyte at an operation potential of the cathode, and once dissolved as a form of metal ions in the electrolyte, they are reduced at an anode and precipitated as metals. The thus-precipitated metals cause the occurrence of internal short-circuiting. Further, when the metal cations are also present in the electrolyte during the fabrication process of the battery, electrodeposition of the metal ions on an anode takes place, thus causing the internal short-circuiting. As a result, the metal ions eluted from the cathode or the metal ions in the impurities present in the electrolyte during the fabrication process of the battery undergo electrodeposition on the anode during the battery operation, consequently resulting in the internal short-circuiting.

Whereas, according to the present invention, it is possible to previously prevent electrodeposition of the metal ions on the anode, due to replacement of such metal ions with the lithium ions, sodium ions and/or ammonium ions, and migration thereof into the cation exchange material.

The cation exchange material is a material containing lithium ions and the like while not exhibiting adverse side effects on the battery operation. Preferably, examples of the cation exchange material may include alumino-silicate, alumino-phosphate and the like. These materials may be used alone or in any combination thereof.

It is advantageous that the cation exchange material has a higher ion exchange capability. Therefore, the mole number of a monovalent cation group consisting of lithium, sodium and ammonium in the cation exchange material is preferably more than 0.1, relative to the total mole number of aluminum, silicon and phosphorus in the alumino-silicate and/or alumino-phosphate.

In order to remove metal ion impurities eluted from the cathode, the cation exchange material should be uniformly distributed inside the battery. If the cation exchange material is unevenly localized in a certain part, it is impossible to remove the metal impurities from the part where the cation exchange material was not distributed. In conclusion, it is important to ensure that the cation exchange material, present as solid particles, is uniformly distributed throughout the inside of the battery.

When the cation exchange material is dispersed in an electrolyte and injected into the battery, the cation exchange material is not correctly positioned between electrodes and is localized to form aggregates outside the battery, due to elution of the metal ion impurities from the cathode and electrodeposition thereof on the anode, and it is therefore difficult to achieve desired effects. This fact can also be confirmed in Examples and Comparative Examples which will be illustrated hereinafter. Hence, in order to achieve homogeneous distribution of the cation exchange material around the cathode or anode, the cation exchange material should be dispersed in electrodes during the mixing process of electrode materials upon fabrication of electrodes prior to the assembly of the battery, or the battery should be assembled after the cation exchange material is previously coated on the separator. As such, the cation exchange material is homogeneously distributed throughout the inside of the battery, and it is possible to effectively remove cation impurities.

Therefore, a target part to which the cation exchange material may be added includes electrodes, separator surface or both of them, as discussed above. Particularly preferably, the cation exchange material is added to the cathode upon fabrication thereof, or is added as a coating on the surface of the separator.

If the cation exchange material has a large particle size, it is difficult to coat the exchange material on the electrode or separator. Therefore, the particle size of the cation exchange material is preferably less than 50 μm.

The amount of the cation exchange material added to the electrode is in a range of 0.005 to 5% by weight, based on the weight of the electrode active material. If the content of the cation exchange material added is excessively low, it may be difficult to substantially remove the metal impurities. If the content of the cation exchange material added is excessively high, this may undesirably lead to a decrease in an energy density of the battery or an increase in internal resistance of the battery, thus causing deterioration of the battery performance.

When it is desired to coat the cation exchange material on the surface of the separator, the cation exchange material, in conjunction with a fluorine-based material such as PVdF as a base material, is dispersed in a suitable solvent and then may be partially or completely coated on the surface of the separator by various coating methods known in the art. Preferably, the cation exchange material is coated in a range of 0.005 to 50 g/m² to the separator.

Hereinafter, the other remaining components necessary for the lithium secondary battery according to the present invention will be described in more detail.

The lithium secondary battery of the present invention is comprised of a cathode, an anode, a separator and a lithium salt-containing, non-aqueous electrolyte, with inclusion of the cation exchange material as mentioned above.

The cathode is, for example, fabricated by applying a mixture of a cathode active material, a conductive material and a binder to a cathode current collector, followed by drying. If necessary, a filler may be further added to the above mixture.

Examples of the cathode active materials that can be used in the present invention may include, but are not limited to, layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+x}Mn_{2-x}O_4$ ($0 \leq x \leq 0.33$), $LiMnO_3$, $LiMn_2O_3$ and $LiMnO_2$; lithium copper oxide ($Li_2CuO_2$); vanadium oxides such as $LiV_3O_8$, $V_2O_5$ and $Cu_2V_2O_7$; Ni-site type lithium nickel oxides of Formula $LiNi_{1-x}M_xO_2$ (M=Co, Mn, Al, Cu, Fe, Mg, B or Ga, and $0.01 \leq x \leq 0.3$); lithium manganese composite oxides of Formula $LiMn_{2-x}M_xO_2$ (M=Co, Ni, Fe, Cr, Zn or Ta, and $0.01 \leq x \leq 0.1$), or Formula $Li_2Mn_3MO_8$ (M=Fe, Co, Ni, Cu or Zn); $LiMn_2O_4$ wherein a portion of Li is substituted with alkaline earth metal ions; disulfide compounds; and $Fe_2(MoO_4)_3$, $LiFe_3O_4$ and the like.

The cathode current collector is generally fabricated to have a thickness of 3 to 500 μm. There is no particular limit to materials for the cathode current collector, so long as they have high conductivity without causing chemical changes in the fabricated battery. As examples of materials for the cathode current collector, mention may be made of stainless steel, aluminum, nickel, titanium, sintered carbon, and aluminum or stainless steel which was surface-treated with carbon, nickel, titanium or silver. The cathode current collector may be fabricated to have fine irregularities on the surface thereof so as to enhance adhesive strength to the cathode active material. In addition, the cathode current collector may take various forms including films, sheets, foils, nets, porous structures, foams and non-woven fabrics.

The conductive material is typically added in an amount of 1 to 50% by weight, based on the total weight of the mixture including the cathode active material. There is no particular limit to the conductive material, so long as it has suitable conductivity without causing chemical changes in the fabricated battery. As examples of conductive materials, mention may be made of conductive materials, including graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives.

The binder is a component assisting in binding between the active material and conductive material, and in binding with the current collector. The binder is typically added in an amount of 1 to 50% by weight, based on the total weight of the mixture including the cathode active material. As examples of the binder, mention may be made of polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluoro rubber and various copolymers.

The filler is an optional ingredient used to inhibit cathode expansion. There is no particular limit to the filler, so long as it does not cause chemical changes in the fabricated battery and is a fibrous material. As examples of the filler, there may be used olefin polymers such as polyethylene and polypropylene; and fibrous materials such as glass fiber and carbon fiber.

The anode is fabricated by applying anode materials to the anode current collector, followed by drying. If necessary, other components as described above may be further included.

The anode current collector is generally fabricated to have a thickness of 3 to 500 µm. There is no particular limit to materials for the anode current collector, so long as they have suitable conductivity without causing chemical changes in the fabricated battery. As examples of materials for the anode current collector, mention may be made of copper, stainless steel, aluminum, nickel, titanium, sintered carbon, copper or stainless steel having a surface treated with carbon, nickel, titanium or silver, and aluminum—cadmium alloys. Similar to the cathode current collector, the anode current collector may also be processed to form fine irregularities on the surfaces thereof so as to enhance adhesive strength to the anode active material. In addition, the anode current collector may be used in various forms including films, sheets, foils, nets, porous structures, foams and non-woven fabrics.

As examples of the anode active materials utilizable in the present invention, mention may be made of carbon such as non-graphitizing carbon and graphite-based carbon; metal composite oxides such as $Li_xFe_2O_3$ ($0 \leq x \leq 1$), $Li_xWO_2$ ($0 \leq x \leq 1$) and $Sn_xMe_{1-x}Me'_yO_z$ (Me: Mn, Fe, Pb or Ge; Me': Al, B, P, Si, Group I, Group II and Group III elements of the Periodic Table of the Elements, or halogens; $0 < x \leq 1$; $1 \leq y \leq 3$; and $1 \leq z \leq 8$); lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni based materials.

The separator is interposed between the cathode and anode. As the separator, an insulating thin film having high ion permeability and mechanical strength is used. The separator typically has a pore diameter of 0.01 to 10 µm and a thickness of 5 to 300 µm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

The lithium salt-containing, non-aqueous electrolyte is composed of a non-aqueous electrolyte and lithium. As the non-aqueous electrolyte, a non-aqueous electrolytic solution, solid electrolyte and inorganic solid electrolyte may be utilized.

As the non-aqueous electrolytic solution that can be used in the present invention, for example, mention may be made of non-protic organic solvents such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

As examples of the organic solid electrolyte utilized in the present invention, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte utilized in the present invention, mention may be made of nitrides, halides and sulfates of lithium such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH and $Li_3PO_4$—$Li_2S$—$SiS_2$.

The lithium salt is a material that is readily soluble in the above-mentioned non-aqueous electrolyte and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imide.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas.

EXAMPLES

Now, the present invention will be described in more detail with reference to the following examples. These examples are provided only for illustrating the present invention and should not be construed as limiting the scope and spirit of the present invention.

Example 1

Iron (II) perchlorate hydrate ($Fe(ClO_4)_2 \cdot xH_2O$) was dissolved in a solution of ethylene carbonate (EC) and ethylmethyl carbonate (EMC) (1:2, v/v) containing 1M $LiPF_6$ salt dissolved therein, which is an electrolyte for a lithium secondary battery, thereby preparing a solution containing 500 ppm of Fe. 2% by weight of alumino-silicate containing ammonium ions ($NH_4^+$) (available from Aldrich) was added to the thus-prepared electrolyte which was then left at room temperature for 24 hours, and the concentration of Fe was determined using inductively coupled plasma-atomic emission spectrophotometer (ICP-AES). The results thus obtained are given in Table 1 below.

Example 2

An experiment was carried out in the same manner as in Example 1, except that alumino-silicate containing sodium ions ($Na^+$) (available from Aldrich) was used instead of ammonium ion ($NH_4^+$)-containing alumino-silicate. The experimental results thus obtained are given in Table 1 below.

Example 3

An experiment was carried out in the same manner as in Example 1, except that alumino-silicate containing lithium ions ($Li^+$) (available from Aldrich) was used instead of ammonium ion ($NH_4^+$)-containing alumino-silicate. The experimental results thus obtained are given in Table 1 below.

Comparative Example 1

An experiment was carried out in the same manner as in Example 1, except that ammonium ion ($NH_4^+$)-containing alumino-silicate was not added. The experimental results thus obtained are given in Table 1 below.

Comparative Example 2

An experiment was carried out in the same manner as in Example 1, except that alumina having no cation exchange capability was used instead of ammonium ion ($NH_4^+$)-containing alumino-silicate. The experimental results thus obtained are given in Table 1 below.

TABLE 1

| Example No. | Concentration of Fe ions in electrolyte after 24 hours |
|---|---|
| Example 1 | 120 |
| Example 2 | 110 |
| Example 3 | 110 |
| Comparative Example 1 | 500 |
| Comparative Example 2 | 500 |

As can be seen from Table 1, electrolytes of Examples 1 through 3 according to the present invention exhibited a significant decrease in the concentration of Fe ions, due to the cation exchange action of alumino-silicate. Whereas, electrolytes of Comparative Examples 1 and 2 showed no change in the concentration of Fe ions.

These experimental results were provided to demonstrate removal effects of metal impurities by a cation exchange material. In an operation process of a practical secondary battery, it can be confirmed through the following Examples and Comparative Examples that the cation exchange material effectively removes the metal impurities only when it is positioned in an electrode or separator other than an electrolyte.

Example 4

Upon fabrication of a cathode, 0.5% by weight of alumino-silicate containing ammonium ions (available from Aldrich) was added to fabricate a cathode. The thus-fabricated cathode and an anode made of graphite were used to fabricate a battery.

In addition, iron (II) perchlorate hydrate ($Fe(ClO_4)_2 \cdot xH_2O$) was dissolved in a solution of ethylene carbonate (EC) and ethylmethyl carbonate (EMC) (1:2, v/v) containing 1M $LiPF_6$ salt dissolved therein, thereby preparing a solution containing 500 ppm of Fe which was then used as an electrolyte. 10 batteries thus fabricated were left in the fully-charged state for one week. As compared to a potential obtained upon completion of battery charge, the number of batteries showing a voltage drop of more than 100 mV is given in Table 2 below.

Example 5

An experiment was carried out in the same manner as in Example 4, except that alumino-silicate containing sodium ions ($Na^+$) (available from Aldrich) was used instead of ammonium ion ($NH_4^+$)-containing alumino-silicate. The experimental results thus obtained are given in Table 2 below.

Example 6

An experiment was carried out in the same manner as in Example 4, except that alumino-silicate containing lithium ions ($Li^+$) (available from Aldrich) was used instead of ammonium ion ($NH_4^+$)-containing alumino-silicate. The experimental results thus obtained are given in Table 2 below.

Comparative Example 3

An experiment was carried out in the same manner as in Example 4, except that ammonium ion ($NH_4^+$)-containing alumino-silicate was not added. The experimental results thus obtained are given in Table 2 below.

TABLE 2

| Example No. | Number of batteries undergoing a voltage drop |
|---|---|
| Example 4 | 2 |
| Example 5 | 3 |
| Example 6 | 2 |
| Comparative Example 3 | 8 |

As can be seen from Table 2, batteries according to the present invention (Examples 4 to 6) exhibited a remarkably small number of batteries undergoing a voltage drop, as compared to batteries according to a conventional prior art (Comparative Example 3).

Example 8

Upon fabrication of an anode, 0.5% by weight of alumino-silicate containing ammonium ions (available from Aldrich) was added to fabricate an anode. The thus-prepared anode and a cathode fabricated in Comparative Example 3 were used to fabricate a battery. In addition, iron (II) perchlorate hydrate ($Fe(ClO_4)_2 \cdot xH_2O$) was dissolved in a solution of ethylene carbonate (EC) and ethylmethyl carbonate (EMC) (1:2, v/v) containing 1M $LiPF_6$ salt dissolved therein, thereby preparing a solution containing 500 ppm of Fe which was then used as an electrolyte. 10 batteries thus fabricated were left in the fully-charged state for one week. The number of batteries showing a voltage drop of more than 100 mV, as compared to a potential obtained upon completion of battery charge, is given in Table 3 below.

Example 9

A common separator was coated with alumino-silicate containing ammonium ions (available from Aldrich) in an amount of 1 g/m², thereby fabricating a separator. Using the thus-fabricated separator, a battery was fabricated and experimented in the same manner as in Comparative Example 3. The experimental results thus obtained are given in Table 3 below.

Comparative Example 4

A battery was fabricated and experimented in the same manner as in Comparative Example 3, except that 0.5% by weight of alumino-silicate containing ammonium ions (available from Aldrich) was further added to an electrolyte. The experimental results are given in Table 3 below. For convenient comparison, the experimental results of Example 4 and Comparative Example 3 in Table 2 are also provided in Table 3 below.

TABLE 3

| Example No. | Number of batteries undergoing a voltage drop |
|---|---|
| Example 4 | 2 |
| Example 8 | 3 |
| Example 9 | 2 |
| Comparative Example 3 | 8 |
| Comparative Example 4 | 6 |

As can be seen from Table 3, the battery of Example 4 in which a cation exchange material was added to a cathode exhibited superior results, as compared to the battery of Example 8 in which the cation exchange material was added to an anode under the same conditions.

In particular, the battery with addition of the cation exchange material to the electrolyte (Comparative Example 4) exhibited better effects, as compared to no addition of the cation exchange material (Comparative Example 3), but suffered from insignificant improvement effects due to a poor dispersibility of the cation exchange material and consequently non-uniform distribution thereof throughout the inside of the battery and localization to form aggregates in certain parts.

INDUSTRIAL APPLICABILITY

As apparent from the above description, a lithium secondary battery according to the present invention improves life characteristics of the battery by replacing metal cations of metal impurities with the lithium ions, sodium ions and/or ammonium ions which are not detrimental to the operation of the battery, thereby removing the metal impurities and consequently preventing electrodeposition of the metal ions on an anode, through addition of a cation exchange material to electrode(s) and/or a surface of a separator.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A lithium secondary battery comprising a cathode, an anode, a separator and a non-aqueous electrolyte comprising a lithium salt,
   wherein the cathode comprises a cation exchange material and/or the anode comprises a cation exchange material and/or the surface of the separator comprises a cation exchange material,
   wherein the cation exchange material comprises an alumino-silicate particle and/or an alumino-phosphate particle comprising cations selected from the group consisting of lithium, sodium, ammonium and any combination thereof and
   wherein the mole number of the cations in the cation exchange material is more than 0.1, relative to the total mole number of aluminum and silicon in the alumino-silicate and/or to the total mole number of aluminum and phosphorus in the alumino-phosphate.

2. The battery according to claim 1, wherein the particle size of the cation exchange material is less than 50 μm.

3. The battery according to claim 1, wherein the cation exchange material is added to a cathode.

4. The battery according to claim 1, wherein the cation exchange material is added to an anode.

5. The battery according to claim 1, wherein the cation exchange material is coated on the surface of the separator.

6. The battery according to claim 1, wherein the amount of the cation exchange material added to the cathode or anode is in the range of 0.005 to 5% by weight, based on a weight of an electrode active material.

7. The battery according to claim 1, wherein the cation exchange material is coated in the range of 0.005 to 50 g/m² to the surface of the separator.

8. The battery according to claim 1, wherein the cation exchange material is dispersed in conjunction with a fluorine-based material as a base material in a solvent and is then partially or completely coated on the surface of the separator.

* * * * *